(12) United States Patent
Morris et al.

(10) Patent No.: US 12,214,743 B2
(45) Date of Patent: Feb. 4, 2025

(54) TORSO SEATBELT SYSTEM

(71) Applicant: GM Global Technology Operations LLC, Detroit, MI (US)

(72) Inventors: Tyler P. Morris, Madison Heights, MI (US); Ryan Aaron Gellner, Livonia, MI (US); Nick Colonna, Vaughan (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/336,190

(22) Filed: Jun. 16, 2023

(65) Prior Publication Data
US 2024/0416862 A1 Dec. 19, 2024

(51) Int. Cl.
*B60R 22/20* (2006.01)
*B60N 2/20* (2006.01)
(Continued)

(52) U.S. Cl.
CPC ............ *B60R 22/201* (2013.01); *B60R 22/26* (2013.01); *B60R 22/34* (2013.01); *B60N 2/20* (2013.01);
(Continued)

(58) Field of Classification Search
CPC ..... B60R 22/20; B60R 22/201; B60R 22/202; B60R 22/203; B60R 22/205; B60R 22/206; B60R 22/26; B60R 22/34; B60R 22/023; B60R 22/18; B60R 2022/207; B60R 2022/208; B60R 2022/1806; B60R 2021/0034; B60N 2/20
(Continued)

(56) References Cited

U.S. PATENT DOCUMENTS 5,649,744 A * 7/1997 Apodaca ................. B60R 22/02
297/484
9,358,947 B1 * 6/2016 Zorn ....................... B60R 22/26
(Continued)

FOREIGN PATENT DOCUMENTS

DE 3741831 A1 6/1989
DE 102022003361 A1 * 3/2023 ............. B60R 22/18
(Continued)

OTHER PUBLICATIONS

German Office Action for German Application No. 102023129631.0; dated Dec. 6, 2024; 4 pages.

*Primary Examiner* — Keith J Frisby
(74) *Attorney, Agent, or Firm* — CANTOR COLBURN LLP (57) ABSTRACT

A seat includes a seat base including a first side and a second side, and a seat back including a first side portion and a second side portion. The seat back is pivotable between an upright configuration and a highly reclined configuration. A torso belt system is arranged at the seat system. The torso belt system includes a retractor mechanism positioned adjacent to one of the seat base and the seat back. An amount of flexible webbing includes a first end anchored at the retractor mechanism and a second end. A selectable anchor is connectable to the second end of the amount of flexible webbing. The selectable anchor is selectively arranged in a first position at the seat base when the seat back is in the upright seating configuration and in a second position at the seat back when the seat back is in the highly reclined seating configuration.

14 Claims, 7 Drawing Sheets

(51) Int. Cl.
  *B60R 22/26* (2006.01)
  *B60R 22/34* (2006.01)
  *B60R 21/00* (2006.01)
  *B60R 22/18* (2006.01)

(52) U.S. Cl.
  CPC .......... *B60R 2021/0034* (2013.01); *B60R 2022/1806* (2013.01); *B60R 2022/208* (2013.01)

(58) Field of Classification Search
  USPC ............ 280/801.1, 801.2, 804, 807, 808
  See application file for complete search history.

(56) References Cited

U.S. PATENT DOCUMENTS

| | | | |
|---|---|---|---|
| 2017/0021795 A1* | 1/2017 | Gallagher | B60N 2/688 |
| 2020/0101874 A1* | 4/2020 | Sekizuka | B60N 2/0244 |
| 2020/0247354 A1* | 8/2020 | Jaradi | B60R 22/023 |
| 2022/0009383 A1 | 1/2022 | Barkow et al. | |
| 2023/0365098 A1* | 11/2023 | Tanabe | B60N 2/1842 |

FOREIGN PATENT DOCUMENTS

| | | | | |
|---|---|---|---|---|
| EP | 1607286 A1 * | 12/2005 | ......... | B60R 22/023 |
| JP | H0535514 U * | 5/1993 | | |

\* cited by examiner

TORSO SEATBELT SYSTEM

INTRODUCTION

The subject disclosure relates to the art of vehicle restraint systems and, more particularly to a torso seatbelt system for a vehicle.

Many passenger vehicles, particularly those manufactured after 1968, are equipped with passenger restraint systems. Initially, vehicles were equipped with lap belts. In some cases, an additional, separate, shoulder belt may have also been provided. The use of lap belts was shown to reduce deceleration injuries. As vehicle seating systems developed, improvements in restraint systems also came into being. A combined lap and shoulder belt was developed and incorporated into vehicles. The combined harness further reduced deceleration injuries.

In addition to passive restraint systems such as lap belts and shoulder belts, supplemental restraint systems, such as airbags were added to further enhance safety of seated passengers. The airbags rapidly inflate upon sensing, for example, a sudden deceleration. The airbags protect interactions between passengers and vehicle surfaces. While passive and supplemental restraint systems have been shown to be effective at protecting seated passengers, they are currently ineffective for reclined passengers. As such, there remains a need to protect passengers that may be in a reclined position. Accordingly, it is desirable to provide a system that may adjust restraint configurations to not only accommodate seated passengers in an upright position but also passengers that may be in a highly reclined or sleeping position.

SUMMARY

A seat system for a vehicle, in accordance with a non-limiting example, includes a seat base having a seating surface including a first side and a second side, and a seat back connected to the seat base. The seat back has a support surface including a first side portion and a second side portion. The seat back is pivotable between an upright seating configuration and a highly reclined seating configuration. A torso belt system is arranged at the seat system. The torso belt system includes a retractor mechanism positioned adjacent to one of the seat base and the seat back. The retractor mechanism includes a spool and a first connector that is fixedly mountable in a vehicle. An amount of flexible webbing includes a first end anchored at the spool and a second end. A selectable anchor is connectable to the second end of the amount of flexible webbing. The selectable anchor is selectively arranged in a first position at the seat base when the seat back is in the upright seating configuration and in a second position at the seat back when the seat back is in the highly reclined seating configuration.

In addition to one or more of the features described herein the selectable anchor is a translatable anchor, the seat system including a motor connected to the translatable anchor, the motor being selectively activated to shift the translatable anchor between the first position and the second position.

In addition to one or more of the features described herein a seat sensor is configured to detect a position of the seat back.

In addition to one or more of the features described herein a guide track has a first end section arranged at one of the first side and the second side and a second end section arranged at the corresponding one of the first side portion and the second side portion, the translatable anchor being selectively shiftable along the guide track between the first end section and the second end section.

In addition to one or more of the features described herein a controller is operatively connected to the motor and the seat sensor, the controller operates the motor to shift the translatable anchor between the first end section and the second end section of the guide track as the seat back pivots between the first position and the second position.

In addition to one or more of the features described herein the seat includes a frame including a first frame portion provided at the seat base and a second frame portion provided at the seat back, the guide track being connected between the first frame portion and the second frame portion.

In addition to one or more of the features described herein the second end of the flexible webbing includes a buckle and the selectable anchor includes a buckle receiver that selectively connects with the buckle.

In addition to one or more of the features described herein the selectable anchor includes a pre-tensioner.

In addition to one or more of the features described herein the selectable anchor includes a first anchor arranged at the first side of the seat base and a second anchor arranged at the first side portion of the seat back.

In addition to one or more of the features described herein a first buckle receiver is arranged at the second side of the seat base and a second buckle receiver is arranged at the second side portion of the seat back, the second end of the flexible webbing includes a buckle connectable to the first buckle receiver when the seat back is in the upright seating configuration and to the second buckle receiver when the seat back is in the highly reclined seating configuration.

A vehicle, in accordance with a non-limiting example, includes a body defining, in part, a passenger compartment and a seat arranged in the passenger compartment. The seat includes a seat base having a seating surface including a first side and a second side, and a seat back connected to the seat base. The seat back has a support surface including a first side portion and a second side portion. The seat back is pivotable between an upright seating configuration and a highly reclined seating configuration. A torso belt system is arranged at the seat. The torso belt system includes a retractor mechanism positioned adjacent to one of the seat base and the seat back. The retractor mechanism includes a spool, and a first connector that is fixedly mountable in a vehicle. An amount of flexible webbing includes a first end anchored at the spool and a second end. A selectable anchor is connectable to the second end of the amount of flexible webbing. The selectable anchor is selectively arranged in a first position at the seat base when the seat back is in the upright seating configuration and in a second position at the seat back when the seat back is in the highly reclined seating configuration.

In addition to one or more of the features described herein the selectable anchor is a translatable anchor, the seat system including a motor connected to the translatable anchor, the motor being selectively activated to shift the translatable anchor between the first position and the second position.

In addition to one or more of the features described herein a seat sensor is configured to detect a position of the seat back.

In addition to one or more of the features described herein a guide track has a first end section arranged at one of the first side and the second side and a second end section arranged at the corresponding one of the first side portion and the second side portion, the translatable anchor being selectively shiftable along the guide track between the first end section and the second end section.

In addition to one or more of the features described herein a controller is operatively connected to the motor and the seat sensor, the controller operating the motor to shift the translatable anchor between the first end section and the second end section of the guide track as the seat back pivots between the first position and the second position.

In addition to one or more of the features described herein the seat includes a frame including a first frame portion provided at the seat base and a second frame portion provided at the seat back, the guide track being connected between the first frame portion and the second frame portion.

In addition to one or more of the features described herein the second end of the flexible webbing includes a buckle and the selectable anchor includes a buckle receiver that selectively connects with the buckle.

In addition to one or more of the features described herein the selectable anchor includes a pre-tensioner.

In addition to one or more of the features described herein the selectable anchor includes a first anchor arranged at the first side of the seat base and a second anchor arranged at the first side portion of the seat back.

In addition to one or more of the features described herein a first buckle receiver is arranged at the second side of the seat base and a second buckle receiver is arranged at the second side portion of the seat back, the second end of the flexible webbing including a buckle connected to the first buckle receiver when the seat back is in the upright seating configuration and to the second buckle receiver when the seat back is in the highly reclined seating configuration.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
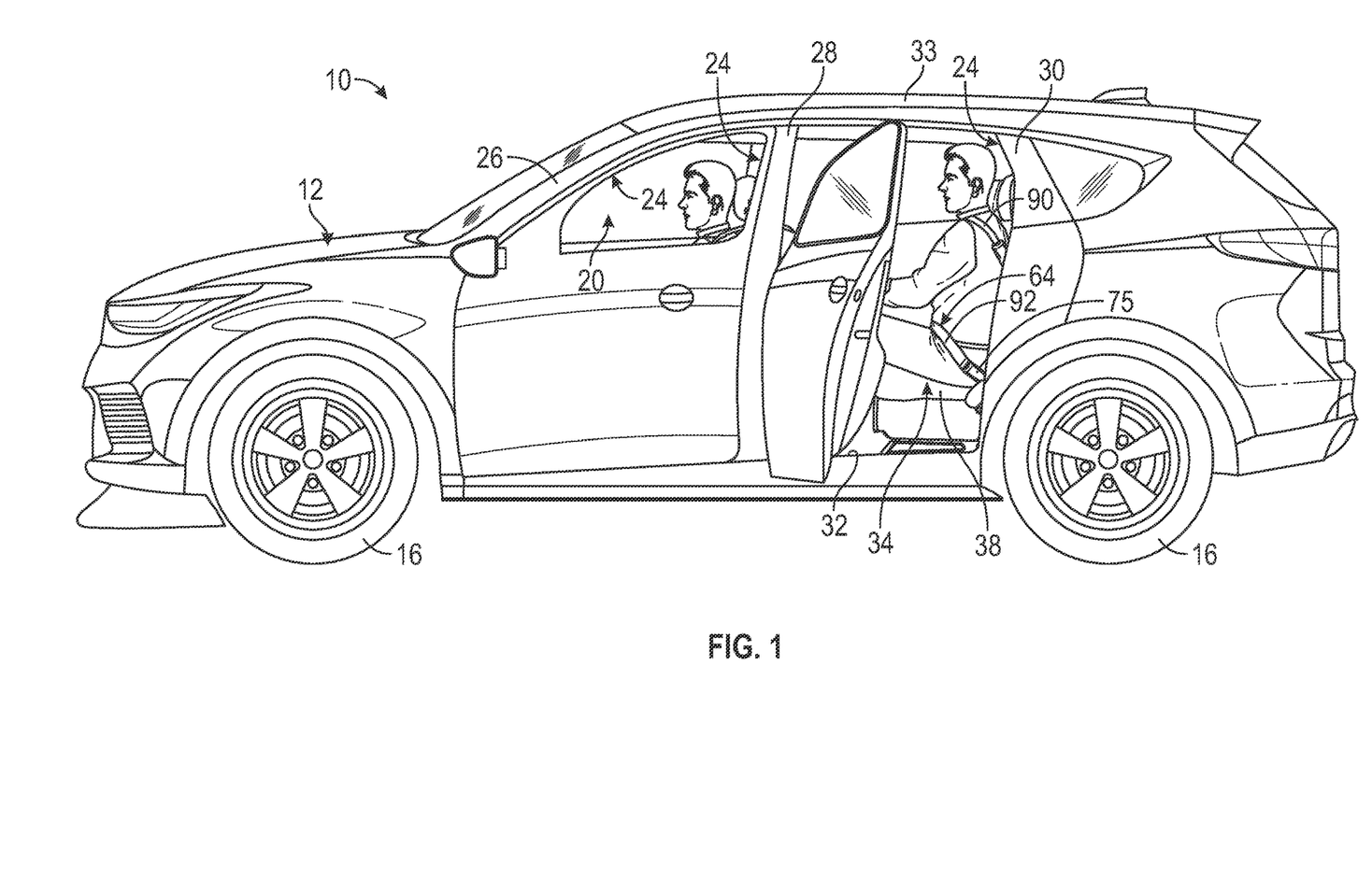
FIG. 1 is a left side view of a vehicle including a torso seatbelt system, in accordance with a non-limiting example.

A vehicle, in accordance with a non-limiting example, is indicated generally at 10 in FIG. 1. Vehicle 10 includes a body 12 supported on a plurality of wheels 16. Body 12 defines, in part, a passenger compartment 20 having a plurality of structural supports 24. Structural supports 24 include an "A"-pillar 26, a "B"-pillar 28, and a C-Pillar 30. Additional structural supports (not separately labeled) are also present. Structural supports 24 extend between a passenger compartment floor 32 and a roof 33. A plurality of seats, one of which is indicated at 34, is arranged in passenger compartment 20. Seats 34 may include outer seats, (e.g., seats that are arranged adjacent to a door), and middle seats, (e.g., seats that are disposed between outer seats).

Figure 2:
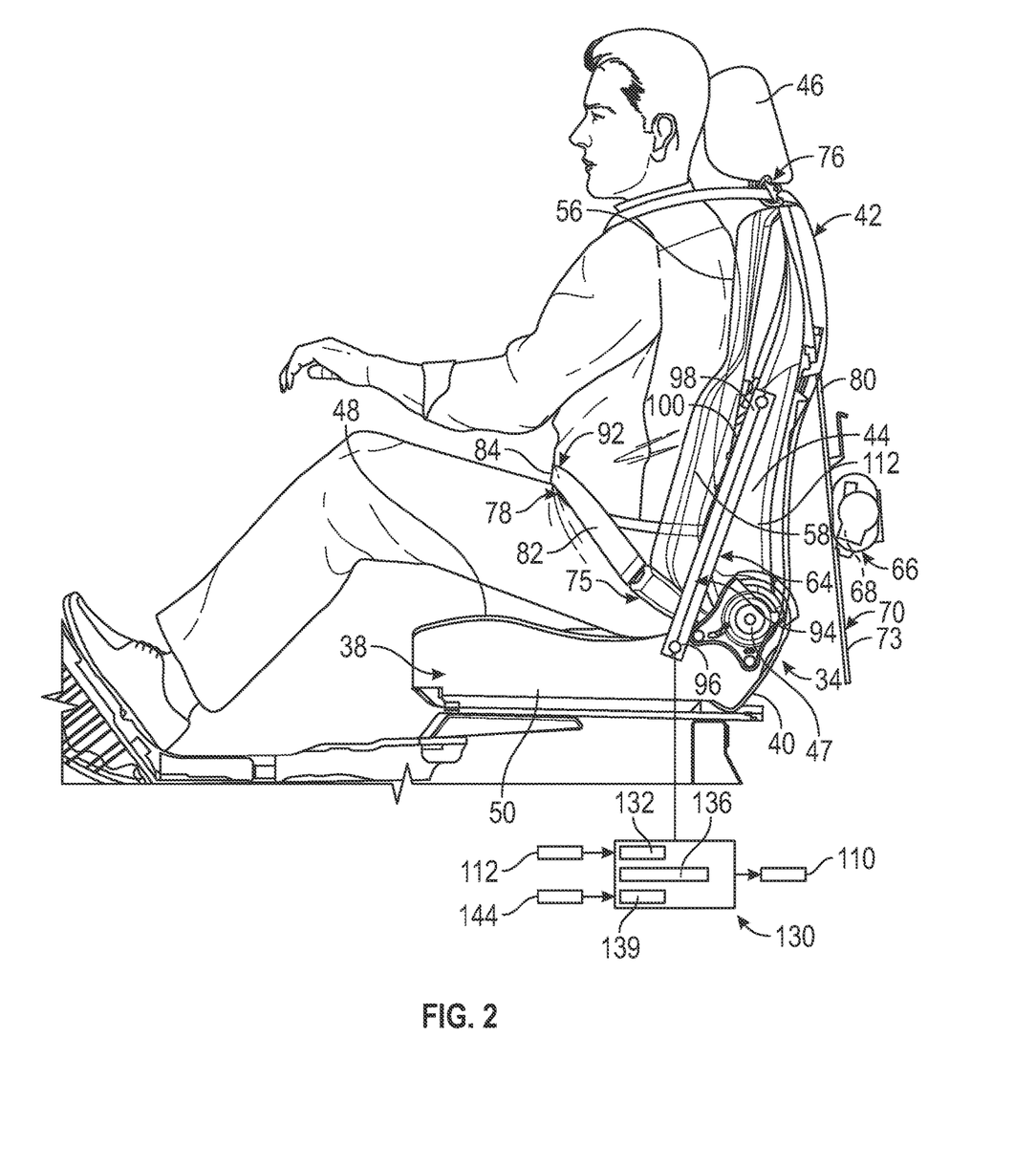
FIG. 2 is a left side view of a seated passenger restrained by the torso seatbelt system arranged in a first configuration, in accordance with a non-limiting example.
Figure 3:
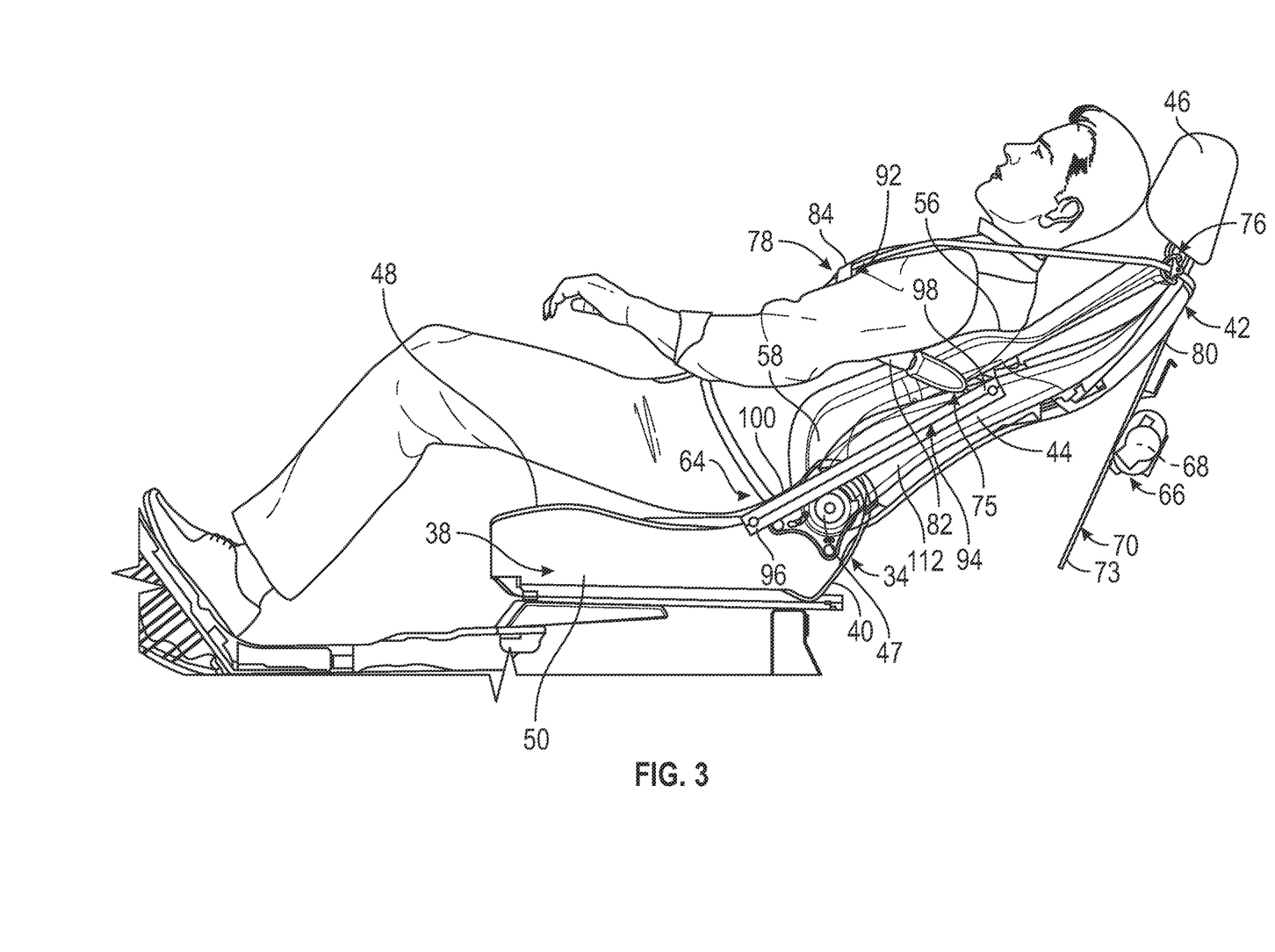
FIG. 3 is a left side view of the seated passenger of FIG. 2 with the torso seatbelt system in a second configuration, in accordance with a non-limiting example.
Figure 4:
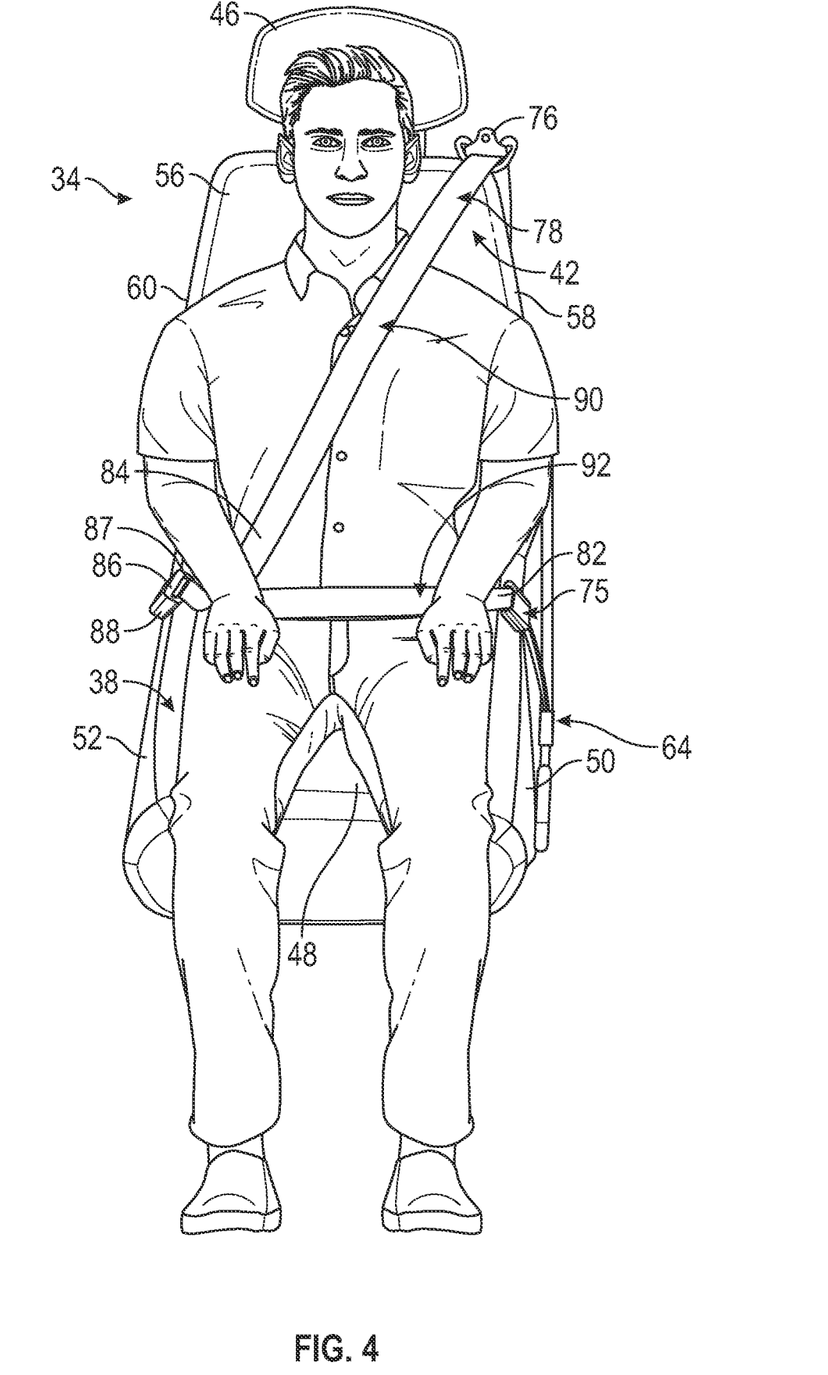
FIG. 4 is a front view of the seated passenger of FIG. 2, in accordance with a non-limiting example.

In accordance with a non-limiting example shown in FIGS. 2 and 3, seat 34 includes a seat base 38 including a base frame 40 and a seat back 42 including a back frame 44 and a headrest 46. Seat back 42 is pivotally connected to seat base 38 through a hinge 47. Seat base 38 includes a seating surface 48 including a first side 50 and a second side 52 (FIG. 4) that is arranged opposite from first side 50. Seat back 42 includes a support surface 56 having a first side portion 58 and a second side portion 60 (FIG. 4). As will be detailed herein, seat back 42 may pivot between an upright position (FIG. 2) and a highly reclined position (FIG. 3). At this point, it should be understood that the term highly reclined position describes a state in which seat back 42 reclines more than 350 from vertical and seat base 38 may pivot upwardly more than 20° from horizontal.

In a non-limiting example, vehicle 10 includes a torso belt system 64 arranged at seat 34. As will be detailed herein, torso belt system 64 may accommodate users seated in seat 34 in either the upright position or the highly reclined position. Torso belt system 64 includes a retractor 66 arranged at seat back 42. Retractor 66 may be mounted at various locations in passenger compartment 20 depending on seat location. For example, retractor 66 may be mounted to "B"-pillar 28 or "C"-pillar 30 for outer seats.

Retractor 66 includes a spool 68 that is spring biased. Spool 68 also includes a locking mechanism (not shown). Retractor 66 includes a first connector 70 that defines a first anchor 73 of torso belt system 64. A first selectable anchor 75 is mounted to first side 50 of seat base 38 and, as will be detailed more fully herein, may transition to and from first side portion 58 of seat back 42. A webbing guide 76 may be mounted at an upper portion (not separately labeled) of seat back 42. For outer rear seat configurations, webbing guide 76 may be connected to, for example "C"-pillar 30. At this point, it should be understood that the term "selectable anchor" describes an anchor that has a selectable anchor point.

A flexible webbing 78 is provided on spool 68. Flexible webbing 78 includes a first end 80 fixedly connected to retractor 66, a second end 82 coupled to first selectable anchor 75, and an intermediate portion 84. Intermediate portion 84 includes a buckle 87, FIG. 4, connected to a second selectable anchor 88 arranged at second side 52 of seat base 38. Second selectable anchor 88 may take the form of a buckle receiver 86 that connects with buckle 87. Intermediate portion 84 may be routed through buckle 87. In a non-limiting example, flexible webbing 78 includes a shoulder belt portion 90 that extends from retractor 66 to second selectable anchor 88 and a lap belt/torso belt portion 92 that extends between first selectable anchor 75 and second selectable anchor 88.

Figure 5:
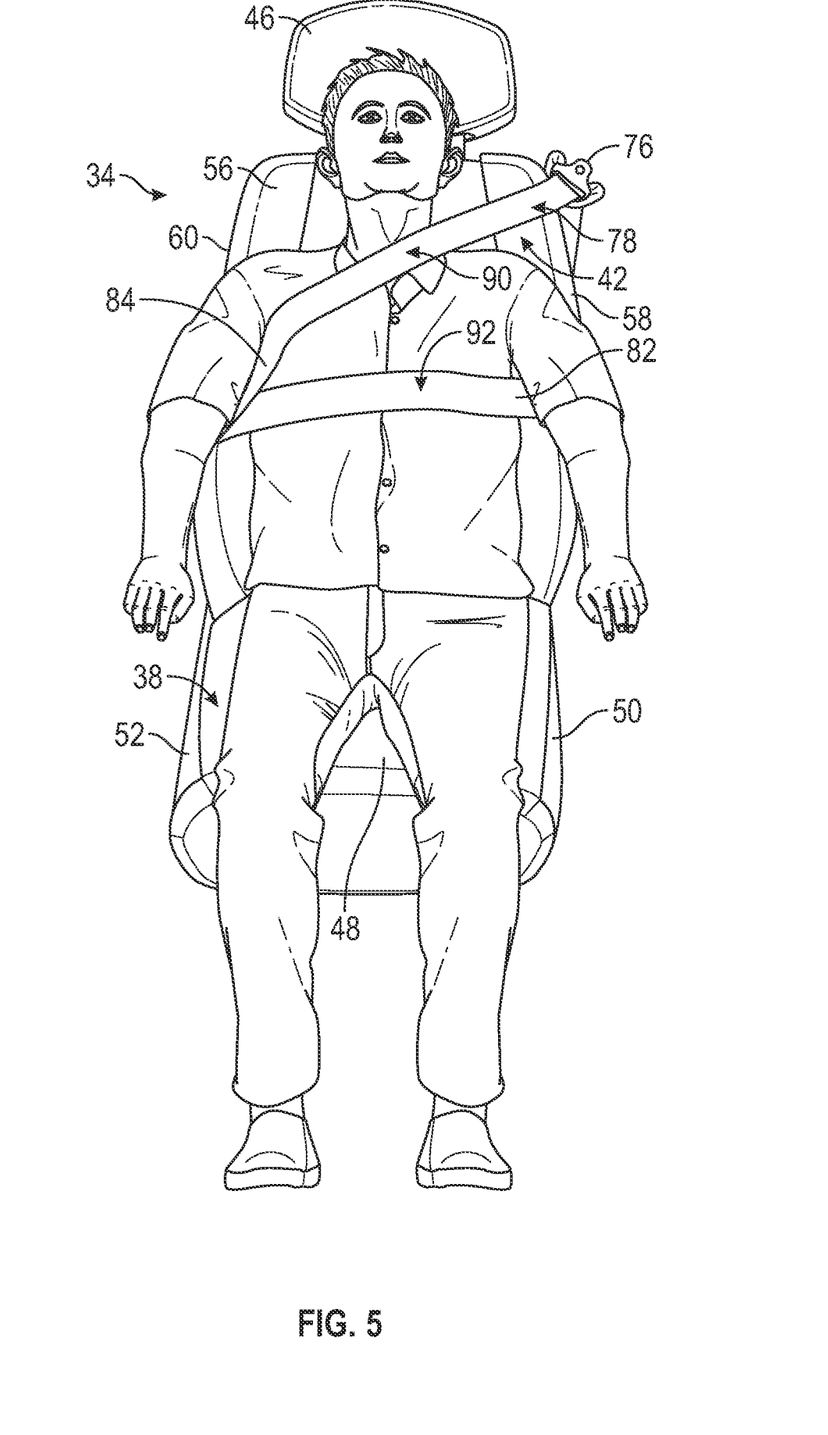
FIG. 5 is a front view of the seated passenger of FIG. 3, in accordance with a non-limiting example.

As will be detailed more fully herein, first selectable anchor 75 and second selectable anchor 88 may shift between a first position, whereby lap belt portion 90 extends across a lap of an occupant, FIGS. 2 and 4, and a second position, whereby lap belt portion 90 extends across a torso of the occupant, FIGS. 3 and 5. First selectable anchor 75 is shifted along a guide track 94 that is mounted in vehicle 10. Second selectable anchor 88 may include a similar guide track (not shown). Guide track 94 is mounted at a first side 50 of seat base 38 and first side portion 58 of seat back 42.

In a non-limiting example, guide track 94 is mounted between base frame 40 and back frame 44. Of course, guide track 94 may also be mounted between passenger compartment floor 32 and "B"-pillar 28, or directly to "B"-pillar 28. Guide track 94 includes a first end section 96 arranged at base frame 40, a second end section 98 arranged at back frame 44, and an intermediate section 100. As will be detailed herein, first selectable anchor 75 is shifted between first end section 96 and second end section 98 along intermediate section 100 as seat back 42 pivots between the upright configuration and the highly reclined configuration. In this manner, lap belt portion 90 is positioned across the occupant's lap when in the upright configuration and across the occupant's torso when in the highly reclined configuration in order to better restrain an occupant in a reclined position during sudden deceleration events.

Figure 6:
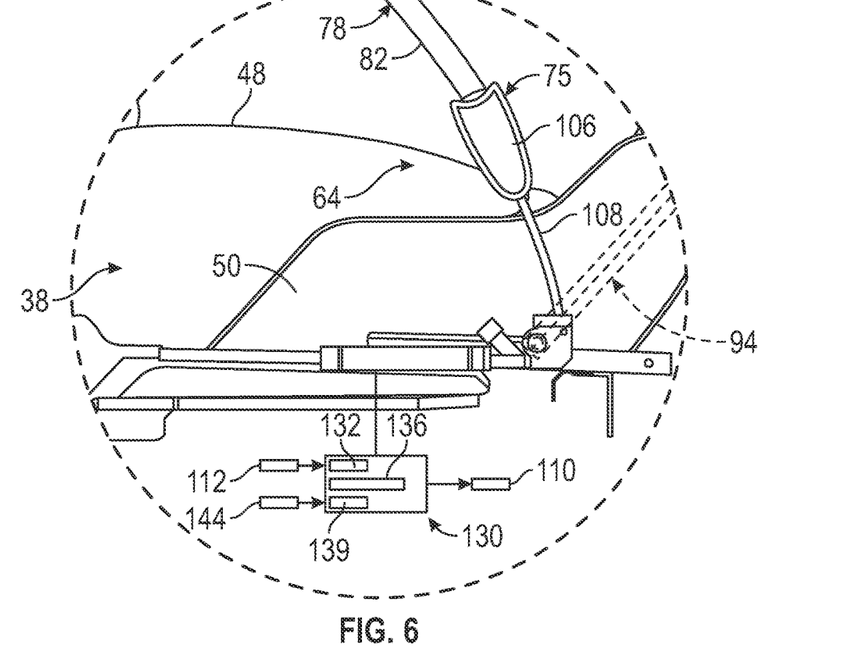
FIG. 6 is a left side view of a pretensioner of the torso seatbelt system in the first configuration, in accordance with a non-limiting example.
Figure 7:
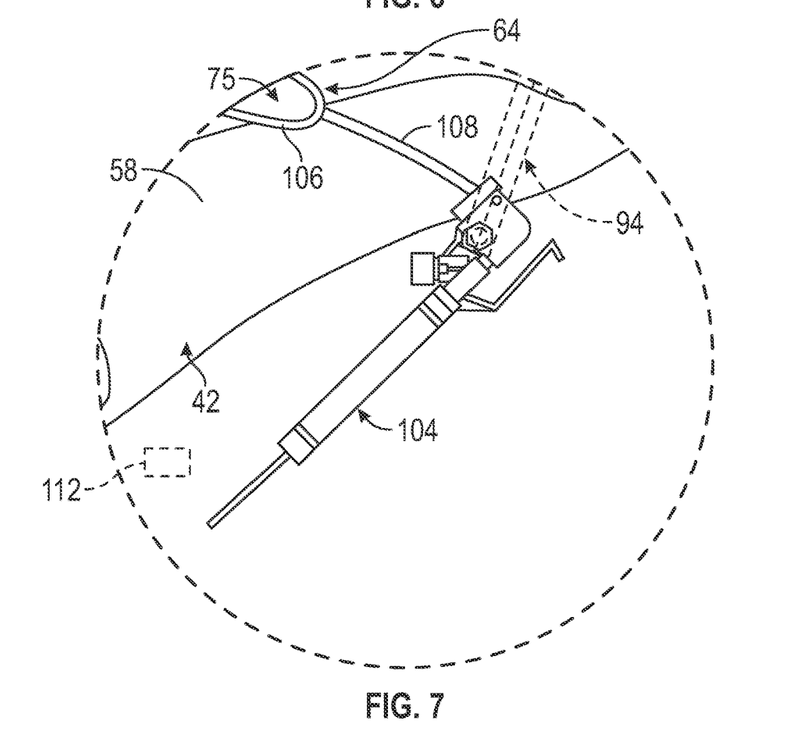
FIG. 7 is a left side view of the pretensioner in the second configuration, in accordance with a non-limiting example.

In a non-limiting example, first selectable anchor 75 may be connected to a pretensioner 104 such as shown in FIGS. 6 and 7. Pretensioner 104 includes first selectable anchor 75. Member 106 is connected to second end 82 of flexible webbing 78. Member 106 is also coupled to a tether 108 that is selectively retracted by pretensioner 104 and may create a pre-load on second end 82 of flexible webbing 78 at the onset of a sudden deceleration. Pretensioner 104 may cooperate with retractor 66 to limit occupant excursions in the event of a sudden deceleration of vehicle 10.

In a non-limiting example, shown in FIGS. 2 and 6, first selectable anchor 75 is connected to a motor 110. Motor 110 shifts selectable anchor 75 along guide track 94 between first end section 96 and second end section 98 based on an angle of seat back 42. A seat sensor 112 is connected to seat back 42. Seat sensor 112 detects, in real-time, the angle of seat back 42. In a non-limiting example, vehicle 10 includes a controller 130 connected to motor 110 and seat sensor 112 as shown in FIGS. 2 and 6. Controller 130 includes a central processor unit (CPU) 132, a non-volatile memory 136, and an anchor control module 139.

If active, controller 130 receives position signals from seat sensor 112 pertaining to changes in seat back angle. Controller 130 signals anchor control module 139 to activate motor 110 and shift first selectable anchor 75 along guide track 94. In a non-limiting example, controller 130 may be selected to operate autonomously, that is without specific input, anchor control module 139 shifts first selectable anchor 75 based on sensed seat position. In another non-limiting example, an actuator 144 may be manually manipulated to shift first selectable anchor 75. Further, a user may store pre-set lap belt portion positions in non-volatile memory 136 that are specific to the user's body geometry. At this point it should be understood that controller 130 may also be connected to second selectable anchor 88.

Figure 8:
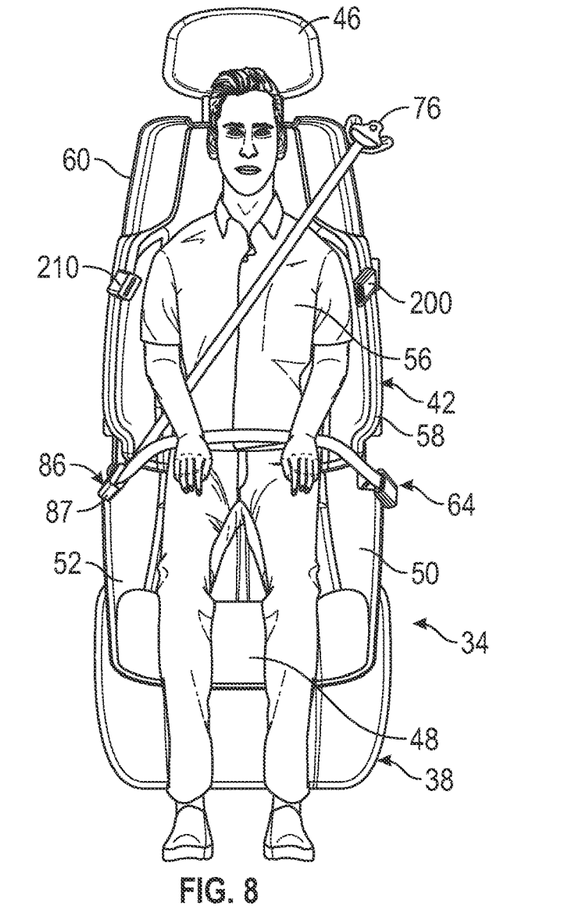
FIG. 8 is a front view of a seat system including a seat base, a seat back, and a torso belt system in accordance with another non-limiting example.
Figure 9:
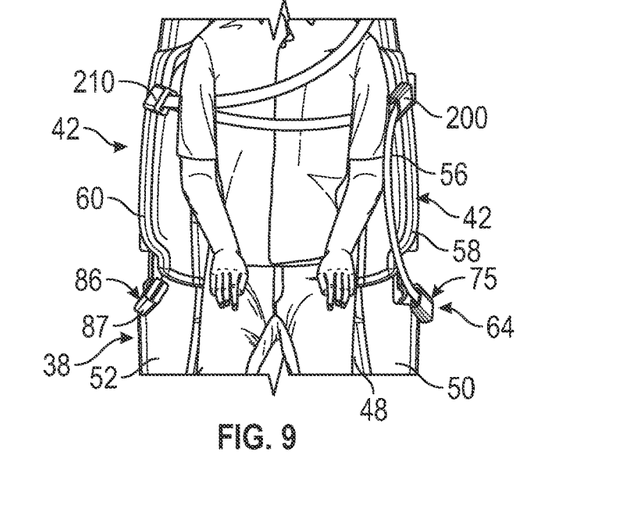
FIG. 9 is a partial view of the seat back of FIG. 8, in accordance with a non-limiting example.

In a non-limiting example shown in FIGS. 8 and 9, the position of torso belt system 64 may be manually selected. In addition to first selectable anchor 75 and second selectable anchor 88, torso belt system 64 includes a webbing guide member 200 mounted to first side portion 58 of seat back 42 and a second buckle receiver 210 mounted to second side portion 60 of seat back 42. In the upright position, lap belt portion 90 of flexible webbing 78 extends between selectable anchor 75 and buckle receiver 87.

In the highly reclined position, lap belt portion 90 may be re-routed. That is, buckle 87 may be disengaged from second selectable anchor 88 and connected to second buckle receiver 210 and intermediate portion 84 may be routed through webbing guide member 200 effectively shifting first selectable anchor 75 upwardly along seat back 42. Alternatively, webbing guide member 200 may be replaced by another selectable anchor (not shown) and first selectable anchor 75 may be disconnected and subsequently reconnected to the second selectable anchor position. At this point, it should be understood that instead of second buckle receiver 210, an additional webbing guide (not shown) may be arranged on second side portion 60 of seat back 42 such that lap belt portion may simply be manually shifted upwardly and re-routed to extend across a torso of an occupant. Further, while shown in connection with an outer seat, the torso belt system may also be employed in connection with middle seat positions.

At this point, it should be understood that the non-limiting examples described herein represent a system for adjusting lap belt position based on seat back angle in order to better restrain reclined occupants. That is, the system adjusts the position of the lap belt to accommodate a reclined or a highly reclined passenger. A lap belt may be less effective for a passenger in such a position. Shifting the lap belt upwardly to a torso of the occupant better restrains reclined occupants.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A seat system for a vehicle comprising:
a seat base including a seating surface having a first side and a second side, and a seat back connected to the seat base, the seat back having a support surface including a first side portion and a second side portion, the seat back being pivotable between an upright seating configuration and a highly reclined seating configuration; and
a torso belt system arranged at the seat system, the torso belt system comprising:
a retractor mechanism positioned adjacent to one of the seat base and the seat back, the retractor mechanism including a spool and a first connector that is fixedly mountable in the vehicle;
an amount of flexible webbing including a first end anchored at the spool and a second end; and
a selectable anchor connectable to the second end of the amount of flexible webbing, the selectable anchor being selectively arranged in a first position at the seat base when the seat back is in the upright seating configuration and in a second position at the seat back when the seat back is in the highly reclined seating configuration;
wherein the selectable anchor is a translatable anchor, the seat system including a motor connected to the translatable anchor, the motor being selectively activated to shift the translatable anchor between the first position and the second position.

2. The seat system according to claim 1, further comprising a seat sensor configured to detect a position of the seat back.

3. The seat system according to claim 2, further comprising a guide track having a first end section arranged at one of the first side and the second side and a second end section arranged at a corresponding one of the first side portion and the second side portion, the translatable anchor being selectively shiftable along the guide track between the first end section and the second end section.

4. The seat system according to claim 3, further comprising a controller operatively connected to the motor and the seat sensor, the controller operating the motor to shift the translatable anchor between the first end section and the second end section of the guide track as the seat back pivots between the upright seating configuration and the highly reclined seating configuration.

5. The seat system according to claim 3, wherein the seat system includes a frame including a first frame portion provided at the seat base and a second frame portion provided at the seat back, the guide track being connected between the first frame portion and the second frame portion.

6. The seat system according to claim 1, wherein the second end of the flexible webbing includes a buckle and the selectable anchor includes a buckle receiver that selectively connects with the buckle.

7. The seat system according to claim 1, wherein the selectable anchor includes a pre-tensioner.

8. A vehicle comprising:
a body defining, in part, a passenger compartment;
a seat system arranged in the passenger compartment, the seat system including a seat base having a seating surface including a first side and a second side, and a seat back connected to the seat base, the seat back having a support surface including a first side portion and a second side portion, the seat back being pivotable between an upright seating configuration and a highly reclined seating configuration; and
a torso belt system arranged at the seat system, the torso belt system comprising:
a retractor mechanism positioned adjacent to one of the seat base and the seat back, the retractor mechanism including a spool and a first connector that is fixedly mounted in the vehicle;
an amount of flexible webbing including a first end anchored at the spool and a second end; and
a selectable anchor connectable to the second end of the amount of flexible webbing, the selectable anchor being selectively arranged in a first position at the seat base when the seat back is in the upright seating configuration and in a second position at the seat back when the seat back is in the highly reclined seating configuration,
wherein the selectable anchor is a translatable anchor, the seat system including a motor connected to the translatable anchor, the motor being selectively activated to shift the translatable anchor between the first position and the second position.

9. The vehicle according to claim 8, further comprising a seat sensor configured to detect a position of the seat back.

10. The vehicle according to claim 9, further comprising a guide track having a first end section arranged at one of the first side and the second side and a second end section arranged at a corresponding one of the first side portion and the second side portion, the translatable anchor being selectively shiftable along the guide track between the first end section and the second end section.

11. The vehicle according to claim 10, further comprising a controller operatively connected to the motor and the seat sensor, the controller operating the motor to shift the translatable anchor between the first end section and the second end section of the guide track as the seat back pivots between the upright seating configuration and the highly reclined seating configuration.

12. The vehicle according to claim 10, wherein the seat system includes a frame including a first frame portion provided at the seat base and a second frame portion provided at the seat back, the guide track being connected between the first frame portion and the second frame portion.

13. The vehicle according to claim 8, wherein the second end of the flexible webbing includes a buckle and the selectable anchor includes a buckle receiver that selectively connects with the buckle.

14. The vehicle according to claim 8, wherein the selectable anchor includes a pre-tensioner.

* * * * *